(12) United States Patent     (10) Patent No.:   US 12,565,074 B2

Furuta            (45) Date of Patent:     Mar. 3, 2026

---

(54) SUSPENSION CONTROL SYSTEM

(71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 18/631,249

(22) Filed: Apr. 10, 2024

(65) Prior Publication Data

US 2025/0065683 A1     Feb. 27, 2025

(30) Foreign Application Priority Data

Aug. 24, 2023    (JP) ................................. 2023-136596

(51) Int. Cl.
     *B60G 17/0165*      (2006.01)

(52) U.S. Cl.
     CPC ...... *B60G 17/0165* (2013.01); *B60G 2204/62* (2013.01); *B60G 2400/821* (2013.01); *B60G 2600/182* (2013.01); *B60G 2800/162* (2013.01); *B60G 2800/916* (2013.01)

(58) Field of Classification Search
None
See application file for complete search history.

(56) References Cited

U.S. PATENT DOCUMENTS

| | | | | | |
|---|---|---|---|---|---|
| 5,322,319 | A | * | 6/1994 | Tanaka | B60G 17/0165 280/5.518 |
| 5,794,168 | A | * | 8/1998 | Sasaki | F16F 9/468 280/5.515 |
| 8,296,009 | B2 | * | 10/2012 | Kajino | B60G 17/0165 701/37 |
| 9,278,599 | B2 | * | 3/2016 | Hirao | B60G 17/06 |
| 9,809,076 | B2 | * | 11/2017 | Hirao | B60G 17/018 |
| 9,963,006 | B2 | * | 5/2018 | Kubota | B60G 17/0165 |
| 11,097,587 | B2 | * | 8/2021 | Toyohira | B60G 17/06 |
| 11,584,183 | B2 | * | 2/2023 | Furuta | B60G 17/0165 |

(Continued)

FOREIGN PATENT DOCUMENTS

| | | | | | |
|---|---|---|---|---|---|
| CN | 112297746 | A | * | 2/2021 | ......... B60G 17/0157 |
| CN | 113752772 | A | * | 12/2021 | ........... B60G 17/015 |

(Continued)

*Primary Examiner* — Kevin R Steckbauer

(74) *Attorney, Agent, or Firm* — SoraIP, Inc.

(57) ABSTRACT

An actuator of a suspension control system is controlled by a control device to adjust a suspension stroke of a controlled wheel of a vehicle. In the control device, a first acquisition unit repeatedly acquires a road surface displacement-related value from a road surface data map. A second acquisition unit acquires a change amount of the road surface displacement-related value per unit time. A control unit controls the actuator so that a control force generated by the actuator when the controlled wheel passes through a predicted passing position matches a target control force. When the change amount of the road surface displacement-related value per unit time is not less than a threshold value, a calculation unit calculates the target control force so that the change amount of the target control force per unit time becomes smaller than that when the amount of change is less than the threshold value.

4 Claims, 6 Drawing Sheets

(56) References Cited

U.S. PATENT DOCUMENTS

| | | | | |
|---|---|---|---|---|
| 11,766,910 | B2 * | 9/2023 | Furuta | B60G 17/0165 |
| | | | | 280/5.515 |
| 11,813,915 | B2 * | 11/2023 | Zhao | B60G 17/018 |
| 11,814,036 | B2 * | 11/2023 | Furuta | B60W 40/06 |
| 11,884,118 | B2 * | 1/2024 | Furuta | B60G 17/0165 |
| 11,884,120 | B2 * | 1/2024 | Furuta | B60G 17/0165 |
| 11,919,353 | B2 * | 3/2024 | Furuta | B60G 17/01908 |
| 11,932,074 | B2 * | 3/2024 | Furuta | B60G 17/0165 |
| 11,938,775 | B2 * | 3/2024 | Furuta | B60G 17/018 |
| 11,945,273 | B2 * | 4/2024 | Furuta | B60G 17/01908 |
| 12,103,347 | B2 * | 10/2024 | Furuta | B60G 17/0165 |
| 12,138,978 | B2 * | 11/2024 | Furuta | B60G 17/06 |
| 2001/0044696 | A1 * | 11/2001 | Saitou | G01C 21/26 |
| | | | | 701/93 |
| 2005/0085969 | A1 * | 4/2005 | Kim | F16F 9/46 |
| | | | | 701/37 |
| 2010/0138108 | A1 * | 6/2010 | Kajino | B60G 17/016 |
| | | | | 701/38 |
| 2014/0095024 | A1 * | 4/2014 | Hirao | B60G 17/08 |
| | | | | 701/37 |
| 2015/0224845 | A1 * | 8/2015 | Anderson | F03G 7/081 |
| | | | | 701/37 |
| 2015/0367702 | A1 * | 12/2015 | Kubota | B60G 17/0165 |
| | | | | 701/37 |
| 2016/0159189 | A1 * | 6/2016 | Hirao | B60G 17/06 |
| | | | | 701/37 |
| 2017/0267048 | A1 * | 9/2017 | Kubota | B60G 17/0165 |
| 2019/0359025 | A1 * | 11/2019 | Wager | B60G 21/005 |
| 2019/0366791 | A1 * | 12/2019 | Toyohira | B60G 17/06 |
| 2021/0331545 | A1 * | 10/2021 | Furuta | B60G 17/0165 |
| 2021/0370738 | A1 * | 12/2021 | Furuta | B60G 17/018 |
| 2021/0379955 | A1 * | 12/2021 | Furuta | B60G 17/0165 |
| 2021/0387498 | A1 * | 12/2021 | Furuta | B60G 17/018 |
| 2021/0402840 | A1 * | 12/2021 | Furuta | B60G 17/01908 |
| 2021/0402841 | A1 * | 12/2021 | Furuta | B60G 17/0165 |
| 2022/0105771 | A1 * | 4/2022 | Furuta | B60G 17/0161 |
| 2022/0105774 | A1 * | 4/2022 | Furuta | B60G 17/0165 |
| 2022/0111695 | A1 * | 4/2022 | Furuta | B60G 17/018 |
| 2022/0118811 | A1 * | 4/2022 | Furuta | B60G 17/06 |
| 2022/0134832 | A1 * | 5/2022 | Furuta | B60G 17/06 |
| | | | | 701/37 |
| 2022/0135021 | A1 * | 5/2022 | Furuta | B60W 40/06 |
| | | | | 701/41 |
| 2023/0286347 | A1 * | 9/2023 | Zhao | B60G 17/018 |
| 2025/0065683 | A1 * | 2/2025 | Furuta | B60G 17/0165 |
| 2025/0065684 | A1 * | 2/2025 | Furuta | B60G 17/0165 |
| 2025/0074129 | A1 * | 3/2025 | Furuta | B60G 17/0165 |

FOREIGN PATENT DOCUMENTS

| | | | | | |
|---|---|---|---|---|---|
| CN | 113771571 | A | * | 12/2021 | B60G 17/0165 |
| CN | 114103581 | A | * | 3/2022 | B60G 17/01908 |
| CN | 114379302 | B | * | 9/2023 | B60G 17/0157 |
| CN | 113771571 | B | * | 4/2024 | B60G 17/0157 |
| DE | 102021114293 | A1 | * | 12/2021 | B60G 17/0165 |
| DE | 102021114293 | B4 | * | 12/2022 | B60G 17/0157 |
| EP | 2209658 | B1 | * | 4/2013 | B60G 17/0165 |
| JP | H0781363 | A | * | 3/1995 | |
| JP | 2845029 | B2 | * | 1/1999 | |
| JP | 2845030 | B2 | * | 1/1999 | |
| JP | 2871289 | B2 | * | 3/1999 | |
| JP | 2962046 | B2 | * | 10/1999 | B60G 17/018 |
| JP | 3052689 | B2 | * | 6/2000 | |
| JP | 2009119948 | A | * | 6/2009 | B60G 17/0162 |
| JP | 4697507 | B2 | * | 6/2011 | |
| JP | 4968005 | B2 | * | 7/2012 | B60G 17/016 |
| JP | 6026207 | B2 | * | 11/2016 | B60G 17/016 |
| JP | 6077968 | B2 | * | 2/2017 | |
| JP | 2022-064361 | A | | 4/2022 | |
| JP | 2025030906 | A | * | 3/2025 | B60G 17/0165 |
| WO | WO-2009063959 | A1 | * | 5/2009 | B60G 17/018 |
| WO | WO-2014145018 | A2 | * | 9/2014 | F16F 9/06 |

* cited by examiner

SUSPENSION CONTROL SYSTEM

CROSS-REFERENCE TO RELATED APPLICATION

This application claims priority to Japanese Patent Application No. 2023-136596 filed on Aug. 24, 2023, incorporated herein by reference in its entirety.

BACKGROUND

1. Technical Field

The present disclosure relates to a suspension control system.

2. Description of Related Art

Japanese Unexamined Patent Application Publication No. 2022-064361 (JP 2022-064361 A) discloses a vibration suppression control device for a vehicle. The vibration suppression control device acquires, as preview information, a road surface displacement-associated value at a predicted passing position based on measurement data. The control device executes preview vibration suppression control in which a control force generation device is controlled based on a final target control force including a first target control force calculated using the preview information. The measurement data includes data in which a road surface displacement-associated value acquired when a measurement vehicle actually travels on a road surface is associated with position information indicating a position at which the road surface displacement-associated value is acquired. The vibration suppression control device sets the magnitude of the first target control force to be small when it is determined that there is a high probability that the road surface state has changed from a past time point.

SUMMARY

When a vehicle travels in an area where the presence and absence of the road surface displacement-associated value are mixed on a map of the measurement data during the preview vibration suppression control, the road surface displacement-associated value changes from a certain value to zero or from zero to a certain value at the boundary of the presence and absence of the road surface displacement-associated value. Therefore, vibration may occur even though there is actually no step on the road surface at the boundary. It is desired to suppress the occurrence of such vibration.

An object of the present disclosure is to provide a suspension control system capable of suppressing the occurrence of vibration at the boundary of the presence and absence of a road surface displacement-associated value.

In order to solve the above issue, a suspension control system according to an aspect of the present disclosure includes:

an actuator that adjusts a suspension stroke of a control target wheel of a vehicle; and a control device that controls the actuator.

The control device includes a first acquisition unit that repeatedly acquires, from a road surface data map in which a road surface displacement-associated value associated with vertical displacement of a road surface is associated with a position, a road surface displacement-associated value at a predicted passing position of the control target wheel a predetermined period after a present time, a second acquisition unit that acquires a change amount of the road surface displacement-associated value per unit time based on the acquired road surface displacement-associated value, a calculation unit that calculates a target control force based on the acquired road surface displacement-associated value, and a control unit that controls the actuator such that a control force generated by the actuator coincides with the target control force when the control target wheel passes the predicted passing position.

When the acquired change amount of the road surface displacement-associated value per unit time is equal to or larger than a threshold value, the calculation unit calculates the target control force to reduce a change amount of the target control force per unit time compared with a case where the acquired change amount is smaller than the threshold value.

According to the present disclosure, it is possible to provide the suspension control system capable of suppressing the occurrence of vibration at the boundary of the presence and absence of the road surface displacement-associated value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Before specifically describing an embodiment, the underlying knowledge will be described. When preview control is performed based on the road surface displacement-related value, it is possible to perform good control if a position where a map is present continues, and it is only impossible to perform preview control if a position where a map is not present continues. The presence of a map indicates the presence of a road surface displacement-related value. The absence of a map indicates that there is no road surface displacement-related value and that the value is zero. The road surface displacement related value is unsprung displacement or the like. However, as described above, in a situation where the presence or absence of the map is mixed, vibration may occur in the sprung structure of the vehicle even though there is no actual step at the boundary. In addition, the same problem occurs even in a case where the map is not successfully generated, that is, a case where the presence or absence of the map is mixed, or an abnormal value is stored in the map due to a sensor value abnormality or the like.

Figure 1A:
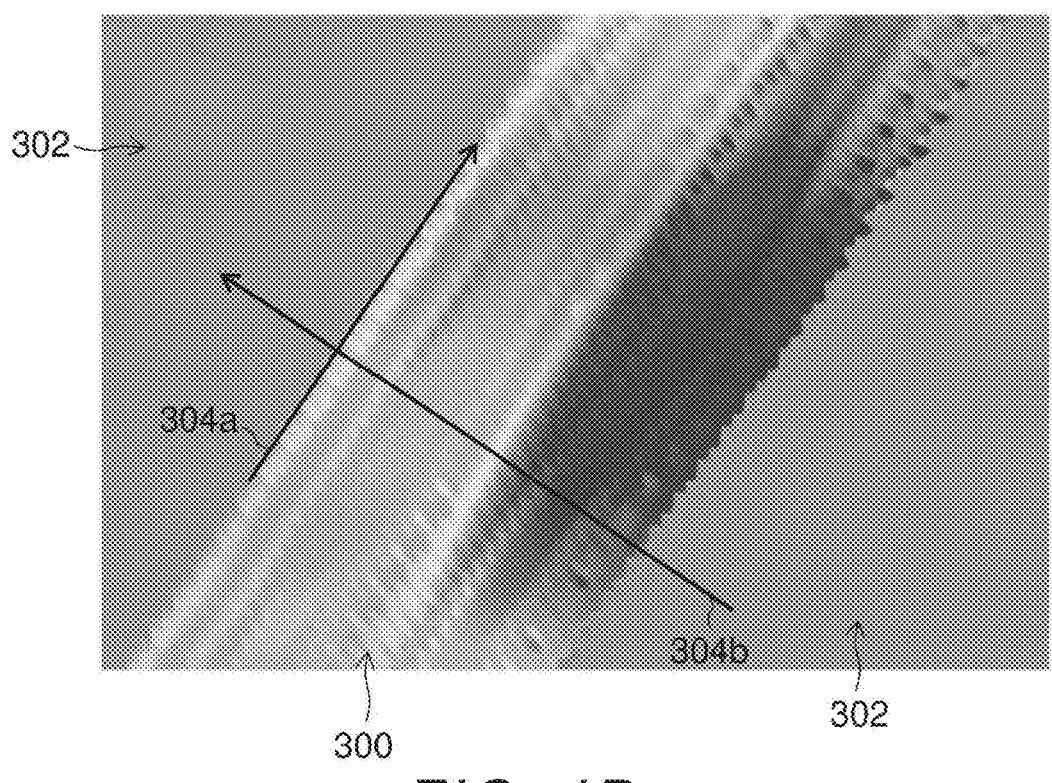
FIG. 1A is a diagram illustrating an example of a road surface displacement-related map.
Figure 1B:
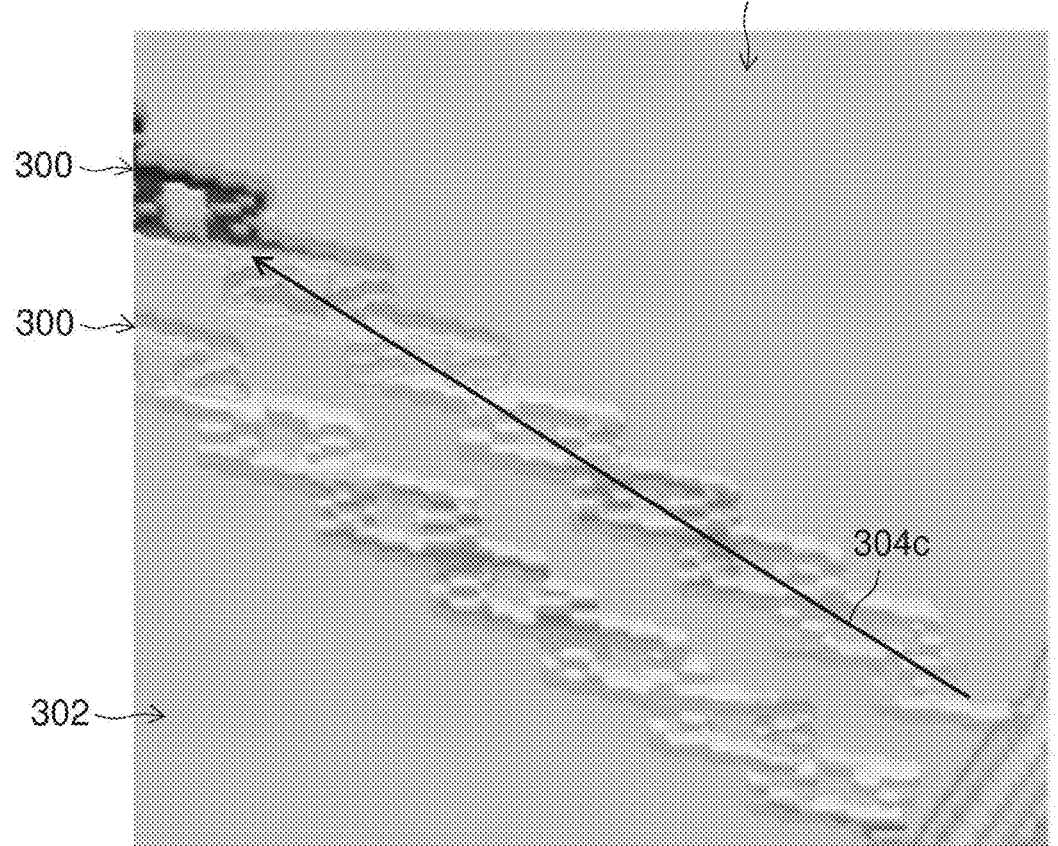
FIG. 1B is a diagram illustrating an example of a road surface displacement-related map.

FIG. 1A and FIG. 1B show an exemplary map of the road surface displacement-related data. In this map, the magnitude of the road surface displacement-related value is represented by the shading of the color. A region 302 with a uniform shade of color indicates that there is no map and the road surface displacement-related value is zero. When the map shown in FIG. 1A and FIG. 1B is displayed, in the preview control according to the comparative example, the road surface displacement-related parameter changes greatly depending on the traveling route even if there is no level difference in practice, and thus vibrations may occur.

FIG. 1A shows an exemplary map generated along a straight roadway. In FIG. 1A, in the area 300, there is a map, and the road surface displacement-related values are set at respective positions. Within region 302, there is no map and the road surface displacement related values are uniformly zero regardless of position. When the vehicle travels along the path 304$a$, the road surface displacement-related value is zero, and the position having a value is alternately generated by traveling on the border with or without the map, so that the sprung structure vibrates.

When the vehicles travel along the path 304$b$, they traverse an area 300 of the map, so that large oscillations occur in the sprung construction when straddling the map or not, and vice versa. Such a situation corresponds to, for example, a case where a road surface traveled once is crossed at an intersection or the like.

FIG. 1B is a diagram illustrating an example in which a map is sparsely generated. Such a map may be generated, for example, when the position information at the time of map creation is abnormal. When the vehicles travel along the path 304$c$ where the maps are abnormally generated, the sprung structures vibrate. When vibration occurs at the boundary with or without the map, the user of the vehicle may feel uncomfortable riding due to the execution of the preview control.

In order to prevent vibration at the boundary between the presence and absence of the map, it is conceivable to apply a constant rate limiter or a low-pass filter to the target control force or the like to suppress a steep change in the target control force. However, in this case, the continuous control performance deteriorates.

Further, since the vibration is deteriorated by already performing the control even if it is determined after straddling the boundary, the effect is small, it is necessary to deal with when straddling the boundary.

Further, although it is conceivable to embed boundary information in the map in advance so that the boundary can be detected in advance, the boundary determination processing is necessary, and the map capacity also increases, which increases the processing cost, the storage cost, and the communication cost.

Therefore, in the embodiment, when the change amount per unit time of the road surface displacement-related value is equal to or larger than the threshold value, it is determined that the change amount is the boundary of the map. By applying a rate limiter or a low-pass filter to time-series data such as a road surface displacement-related value or a target control force, the amount of change of the target control force per unit time is reduced. Accordingly, it is possible to suppress the occurrence of vibration of the sprung structure at the boundary without affecting the control performance outside the boundary of the map.

Hereinafter, an embodiment of the present disclosure will be described in detail with reference to the drawings. In the description, the same elements are denoted by the same signs, and overlapping descriptions are omitted as appropriate.

1. Suspension and Road Surface Displacement Related Values

Figure 2:
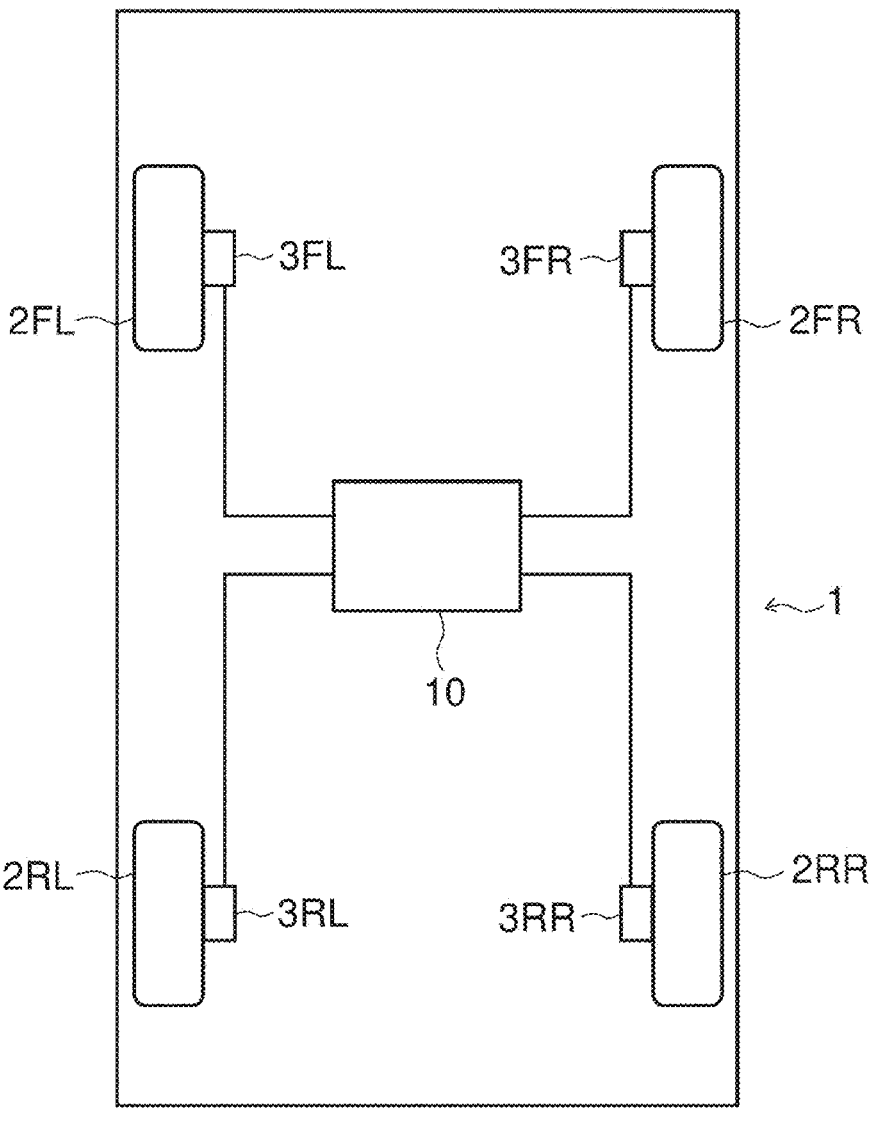
FIG. 2 is a diagram schematically illustrating a configuration of a vehicle according to the embodiment.

FIG. 2 schematically illustrates a configuration of a vehicle 1 according to the embodiment. Vehicle 1 is equipped with a left front wheel 2FL, right front wheel 2FR, left back wheel 2RL, right back wheel 2RR, suspension 3FL, suspension 3FR, suspension 3RL, suspension 3RR, and suspension control system 10. For each of the left front wheel 2FL, right front wheel 2FR, left rear wheel 2RL, and right rear wheel 2RR, corresponding items are provided among the suspension 3FL, suspension 3FR, suspension 3RL, and suspension 3RR. Hereinafter, when there is no need for particular distinction, each wheel is referred to as a wheel 2, and each suspension is referred to as a suspension 3.

Figure 3:
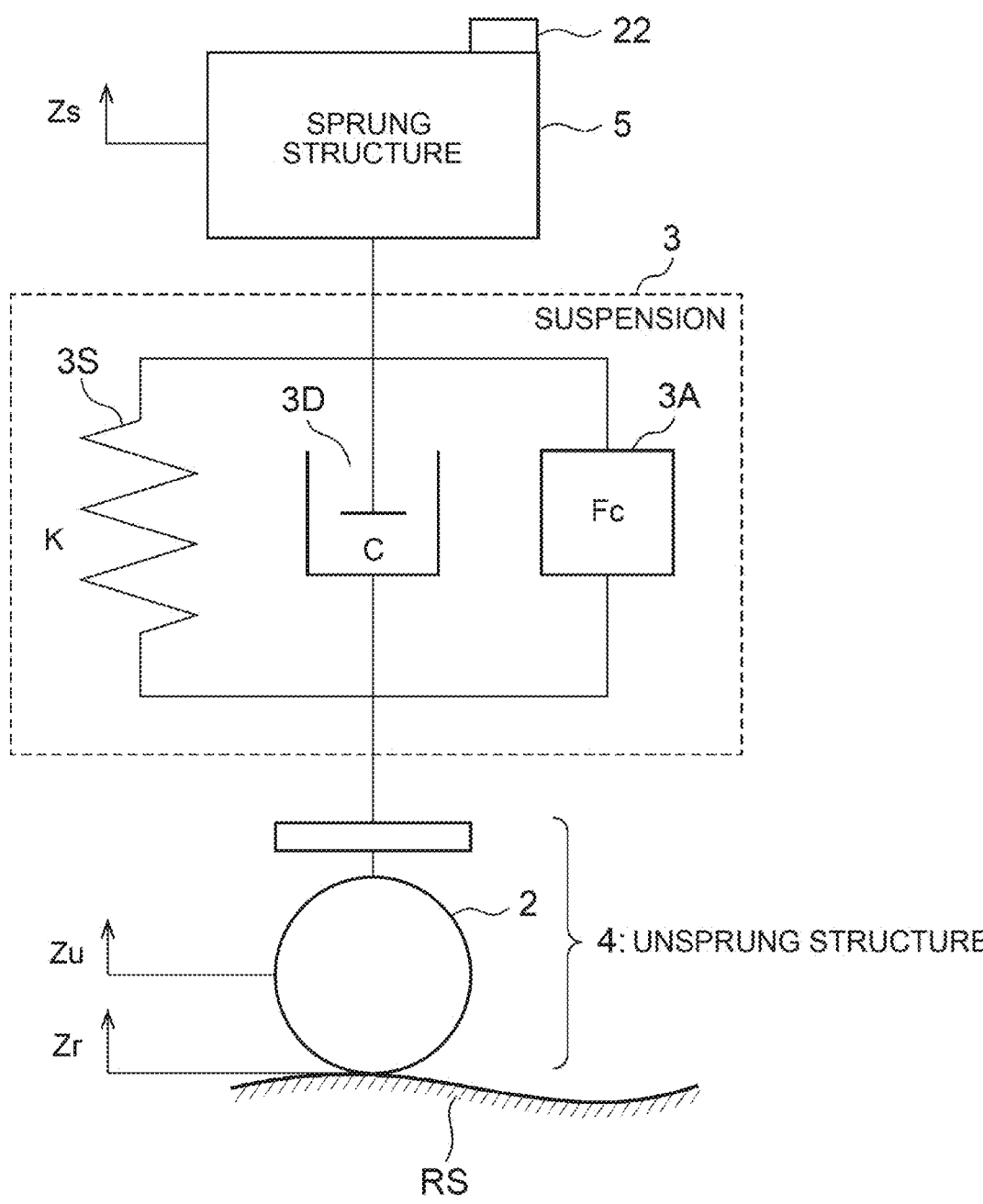
FIG. 3 is a view schematically showing a configuration of the suspension of FIG. 2.

FIG. 3 schematically shows the configuration of the suspension 3 of FIG. 2. The suspension 3 is provided to connect between the unsprung structure 4 and the sprung structure 5 of the vehicle 1. The unsprung structure 4 includes wheels 2. The suspension 3 includes a spring 3S, a damper 3D, and an actuator 3A. The damper 3D is also referred to as a shock absorber. The spring 3S, the damper 3D, and the actuator 3A are provided in parallel between the unsprung structure 4 and the sprung structure 5. The actuator 3A controls the stroke of the suspension 3. The spring rate of the spring 3S is K. The damping factor of the damper 3D is C. The actuator 3A exerts a vertical control force Fc between the unsprung structure 4 and the sprung structure 5, thereby adjusting the stroke of the suspension 3.

More specifically, the actuator 3A is, for example, an electric or hydraulic active actuator, which constitutes a so-called full active suspension. Alternatively, the actuator 3A may be, for example, an actuator that varies the damping force generated by the damper 3D, or an actuator of an active stabilizer device. Furthermore, the "actuator" of the present disclosure may be an actuator, for example, an electric motor, which generates a vehicle longitudinal force in a vehicle including a suspension. The suspension is configured to be capable of converting a driving force and a braking force, which are vehicle-front-rear forces acting on the wheels, into a control force Fc by using, for example, a suspension geometry. The electric motor may be, for example, an in-wheel motor (IWM) provided on a wheel, or may be an electric motor capable of driving a wheel via a vehicle drive shaft.

Here, the term is defined. The "road surface displacement Zr" is a vertical displacement of the road surface RS. The "unsprung displacement Zu" is the vertical displacement of the unsprung structure 4. The "sprung displacement Zs" is a vertical displacement of the sprung structure 5. The "unsprung speed Zu'" is the vertical speed of the unsprung structure 4. The "sprung speed Zs" is the vertical speed of the sprung structure 5. The "unsprung acceleration Zu" is the vertical acceleration of the unsprung structure 4. The "sprung acceleration Zs" is the vertical acceleration of the sprung structure 5. Note that the sign of each parameter is positive in the case of the upward direction and negative in the case of the downward direction.

The wheels 2 move on the road surface RS. Hereinafter, a value related to the road surface displacement Zr is referred to as a "road surface displacement related value". Examples of the road surface displacement related value include a road surface displacement Zr, a road surface displacement speed Zr' which is a time-differential value of the road surface displacement Zr, an unsprung displacement Zu, an unsprung speed Zu', an unsprung acceleration Zu ", an sprung displacement Zs, an sprung speed Zs', and an sprung acceleration Zs". The road surface displacement-related value may also be referred to as a "vertical motion parameter" which is a parameter related to the vertical motion of the wheel 2.

In the following, an example in which the road surface displacement related value is the unsprung displacement Zu will be described. In the case of generalization, "unsprung displacement" in the following description is read as "road surface displacement related value".

Here, an example of the unsprung displacement calculation process will be described. First, the sprung acceleration Zs" is detected by the sprung acceleration sensor 22 installed in the sprung structure 5. Next, the sprung displacement Zs is calculated by integrating the sprung acceleration Zs" on the second floor.

Next, a stroke ST is obtained, which is the relative displacement between the sprung structure 5 and the sprung structure 4. "Stroke ST"="sprung displacement Zs"–"unsprung displacement Zu". For example, the stroke ST is detected by a stroke sensor installed in the suspension 3. As another example, the stroke ST may be estimated based on the sprung acceleration Zs" by an observer configured based on a single-wheel two-degree-of-freedom model.

Next, in order to suppress the effect of sensor drifting or the like, the time-series data of the sprung displacement Zs is filtered. Similarly, the time-series data of the stroke ST is filtered. For example, the filter is a band-pass filter that passes signal components in a specific frequency band. The specific frequency band may be set to include the sprung resonance frequency of the vehicle 1. For example, the specified frequency band is 0.3 to 10 Hz.

Next, the difference between the sprung displacement Zs and the stroke ST is calculated as the unsprung displacement Zu.

Instead of performing the filtering process on the time-series data of the sprung displacement Zs and the stroke ST, the filtering process may be performed on the time-series data of the calculated unsprung displacement Zu.

As yet another example, the unsprung acceleration Zu" may be detected by the unsprung acceleration sensor, and the unsprung displacement Zu may be calculated from the unsprung acceleration Zu".

2. Suspension Control System

Figure 4:
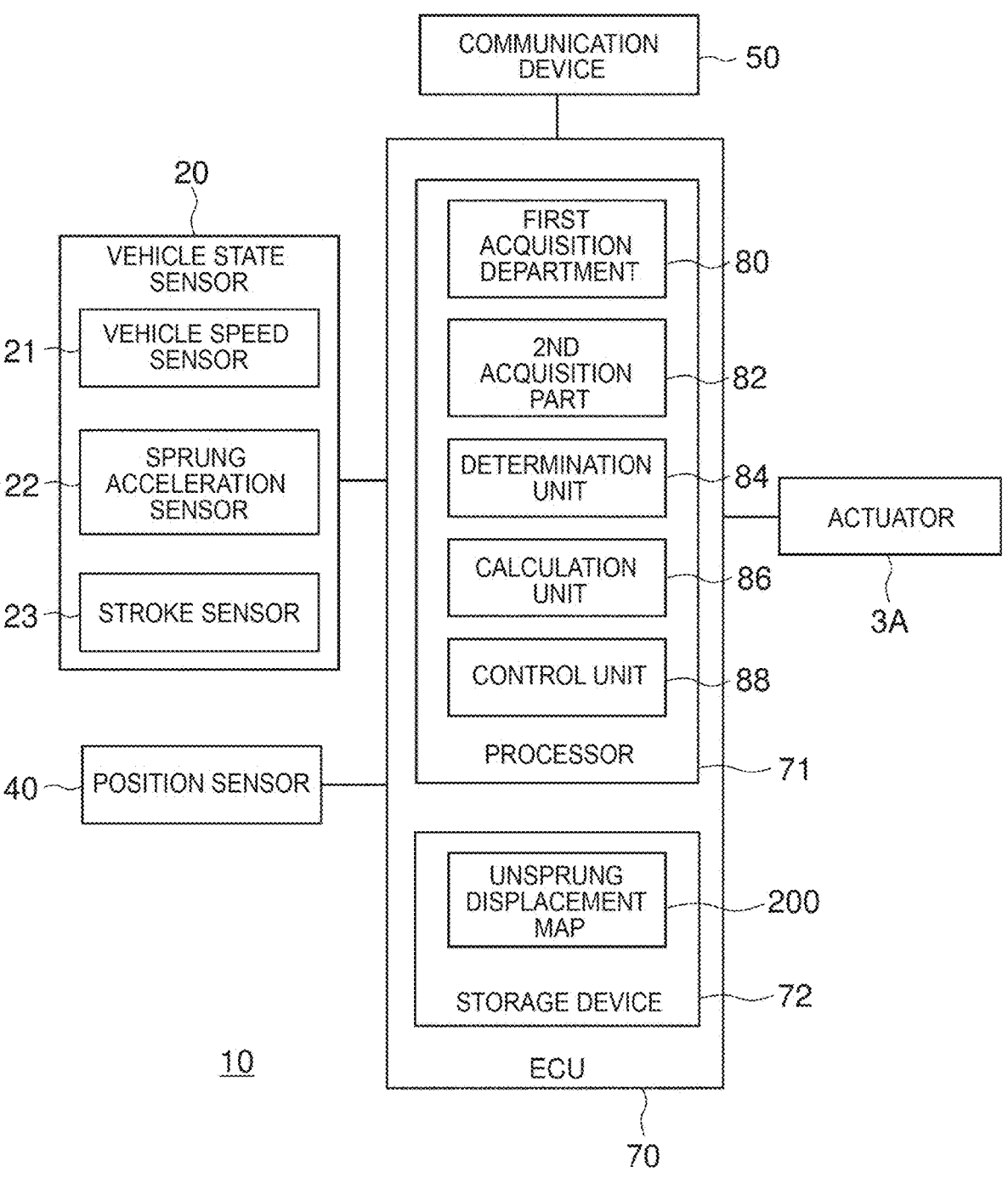
FIG. 4 is a block diagram illustrating a configuration example of the suspension control system according to the embodiment.

FIG. 4 is a block diagram illustrating a configuration example of the suspension control system 10 according to the embodiment. The suspension control system 10 is mounted on the vehicle 1. The suspension control system 10 includes a vehicle state sensor 20, a position sensor 40, a communication device 50, an actuator 3A, and a ECU 70. ECU 70 is an electronic control unit.

The vehicle state sensor 20 detects the state of the vehicle 1 and supplies the detected state to ECU 70. The vehicle state sensor 20 includes a vehicle speed sensor 21 for detecting the vehicle speed V of the vehicle 1, a sprung acceleration sensor 22 for detecting the sprung acceleration Zs", and a stroke sensor 23 for detecting the stroke ST. The vehicle state sensor 20 may include an unsprung acceleration sensor. The vehicle state sensor 20 may include a lateral acceleration sensor, a yaw rate sensor, a steering angle sensor, and the like.

The position sensor 40 detects the position and the azimuth of the vehicle 1 and supplies the detected position information to ECU 70. For example, the position sensor 40 includes a Global Navigation Satellite System (GNSS) receiver.

The communication device 50 communicates with the outside of the vehicle 1.

ECU 70 is a computer that controls the vehicles 1. ECU 70 includes a processor 71 and a storage device 72. The processor 71 executes various processes. For example, the processor 71 includes a Central Processing Unit (CPU). The storage device 72 stores various kinds of information necessary for processing by the processor 71. Examples of the storage device 72 include volatile memory, non-volatile memory, Hard Disk Drive (HDD), Solid State Drive (SSD), and the like.

The processor 71 includes a first acquisition unit 80, a second acquisition unit 82, a determination unit 84, an calculation unit 86, and a control unit 88. When the processor 71 executes the suspension control program stored in the storage device 72, the functions of the first acquisition unit 80, the second acquisition unit 82, the determination unit 84, the calculation unit 86, and the control unit 88 are realized. The suspension control program may be recorded in a computer-readable recording medium. ECU 70 corresponds to an exemplary "control device" of the present disclosure.

The storage device 72 stores an unsprung displacement map 200. Details of the unsprung displacement map 200 will be described later.

ECU 70 controls the suspension 3 by controlling the actuator 3A. Specifically, ECU 70 controls the suspension 3 to perform vibration damping control for suppressing vibrations of the vehicles 1. ECU 70 controls the actuator 3A to generate a vertical control force Fc between the unsprung structure 4 and the sprung structure 5, as shown in FIG. 3. The vibration damping control includes "preview control" described later. Details of the damping control will be described later.

3. Map Management Device 3-1. Configuration Example

Figure 5:
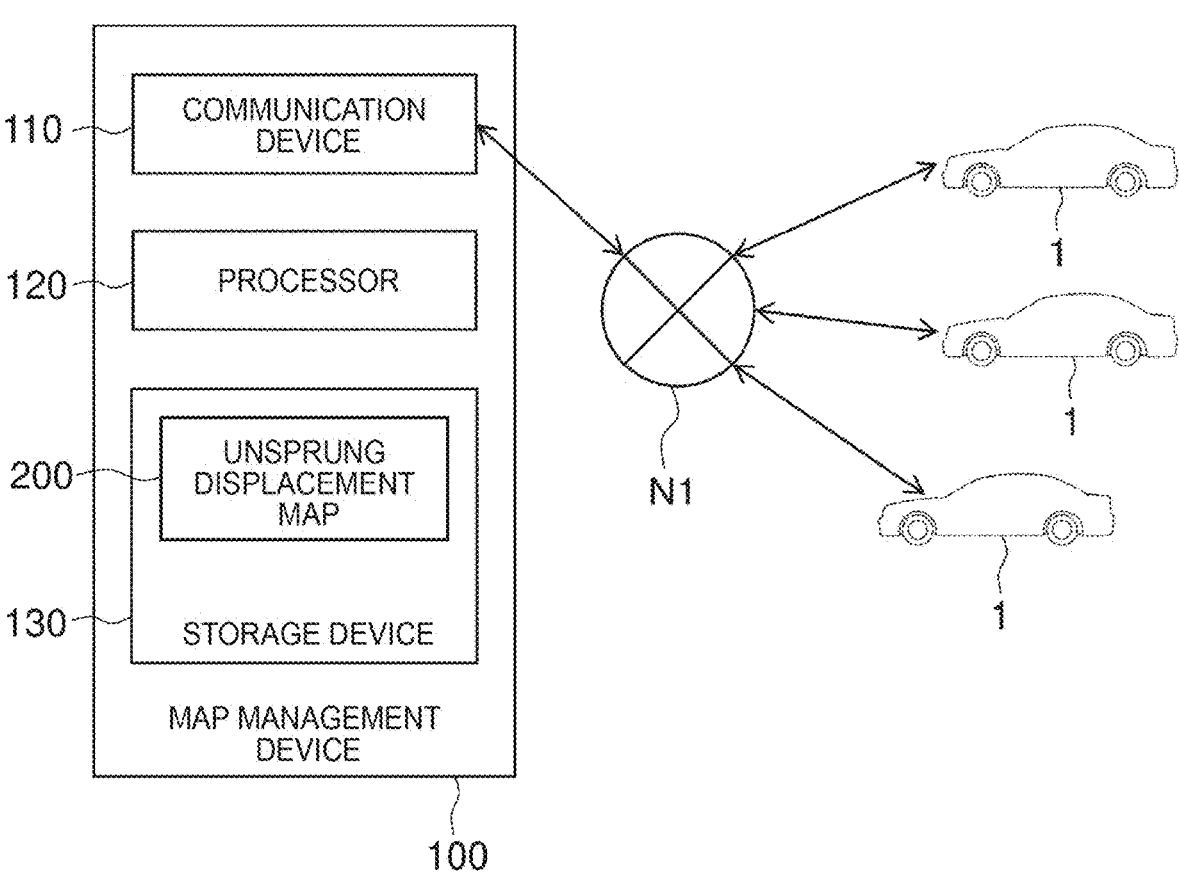
FIG. 5 is a block-diagram illustrating an exemplary configuration of the map managing device according to the embodiment.

FIG. 5 is a block diagram illustrating a configuration example of the map management device 100 according to the embodiment. The map management device 100 is a computer that manages various types of map information. Managing the map information includes generating, updating, providing, and distributing the map information. Typically, the map management device 100 is a management server on the cloud. The map management device 100 may be a distributed system in which a plurality of servers perform distributed processing.

The map management device 100 includes a communication device 110. The communication device 110 is connected to a communication networking N1. For example, the communication device 110 communicates with a large number of vehicles 1 via a communication networking N1.

The map management device 100 further includes a processor 120 and a storage device 130. The processor 120 executes various types of information processing. For example, the processor 120 includes a CPU. The storage device 130 stores various types of map information. The storage device 130 stores various kinds of information necessary for processing by the processor 120. Examples of the storage device 130 include a volatile memory, a non-volatile memory, and a HDD, SSD.

The map management program is a computer program for map management, and is executed by the processor 120. The map management program is stored in the storage device 130. Alternatively, the map management program may be recorded in a computer-readable recording medium. When the processor 120 executes the map management program, the function of the map management device 100 is realized.

The processor 120 communicates with the suspension control system 10 of the vehicle 1 via the communication device 110. The processor 120 collects various types of information from the suspension control system 10, and generates and updates map information based on the collected information. The processor 120 distributes the map information to the suspension control system 10. The processor 120 provides map information in response to a request from the suspension control system 10.

3-2. Unsprung Displacement Map

One of the map information managed by the map management device 100 is an unsprung displacement map 200. The unsprung displacement map 200 is a map of unsprung displacement Zu, which is a road surface displacement related value. The unsprung displacement map 200 is stored in the storage device 130. The unsprung displacement map 200 corresponds to an example of "a road surface data map in which a road surface displacement-related value and a position related to vertical displacement of a road surface are associated" of the present disclosure.

The unsprung displacement map 200 represents the correspondence between the position (X, Y) and the unsprung displacement Zu in XY plane. In other words, the unsprung displacement map represents the unsprung displacement Zu as a function of position (X, Y). XY plane represents a horizontal plane. For example, an absolute coordinate system in a horizontal plane is defined by a latitude direction and a longitude direction, and a position is defined by a latitude and a longitude.

The road area may be partitioned into meshes on a horizontal plane. That is, the road area may be divided into a plurality of unit areas (hereinafter, referred to as "road surface sections") on the horizontal plane. The road section is, for example, square. The length of one side of the square is, for example, 10 cm. The unsprung displacement map 200 represents a correspondence between the position of the road surface section and the unsprung displacement Zu. The position of the road surface section may be defined by a representative position of the road surface section, for example, a center position, or may be defined by a latitude range and a longitude range of the road surface section. The unsprung displacement Zu of the road surface section is, for example, the mean of the unsprung displacement Zu acquired in the road surface section. The smaller the road segment, the greater the resolution of the unsprung displacement map 200.

3-3. Map Generation and Update Processing

The processor 120 collects information from a large number of vehicles 1 via the communication device 110. Then, the processor 120 generates and updates the unsprung displacement map 200 based on the information collected from the plurality of vehicles 1.

The position in the unsprung displacement map 200 is a position where the wheel 2 has passed. The position of each wheel 2 is calculated based on the position information detected by the position sensor 40. Specifically, the relative positional relationship between the reference point of the vehicle position in the vehicle 1 and each wheel 2 is known information. The position of each wheel 2 can be calculated based on the relative positional relationship and the vehicle position indicated by the positional information.

The unsprung displacement Zu is calculated by the above-described methods. That is, by using the vehicle state sensor 20 mounted on the vehicle 1, the sprung displacement Zs and the stroke ST can be obtained. These sprung displacement Zs and stroke ST are referred to as "sensor-based information" for convenience. The unsprung displacement Zu is calculated based on the sensor-based information.

For example, during traveling of the vehicle 1, ECU 70 of the suspension control system 10 calculates the unsprung displacement Zu in real time based on the sensor-based information. ECU 70 also associates the same-timed wheel position with the unsprung displacement Zu. Then, ECU 70 transmits a set of time-series data of the wheel position and time-series data of the unsprung displacement Zu to the map management device 100. The processor 120 of the map management device 100 generates and updates the unsprung displacement map based on the time series data of the wheel position and the time series data of the unsprung displacement Zu.

Alternatively, ECU 70 of the suspension control system 10 associates the same-timed wheel position with the sensor-based data. Then, ECU 70 transmits a set of time-series data of the wheel position and time-series data of the sensor base information to the map management device 100. The processor 120 of the map management device 100 calculates the unsprung displacement Zu based on the received sensor-based data. Further, the processor 120 generates and updates the unsprung displacement map based on the time series data of the wheel position and the time series data of the unsprung displacement Zu.

The processor 120 of the map management device 100 acquires map update information from the suspension control system 10 of the vehicle 1 via the communication device 110. The map update information includes time-series data of the wheel position, which is the position of the vehicle 1. The map updating information includes time-series data of sensor-based information required for calculating the unsprung displacement Zu. Alternatively, the map updating data may include time series data of the unsprung displacement Zu calculated by ECU 70 of the suspension control system 10.

The processor 120 of the map management device 100 generates and updates the unsprung displacement map 200 based on the map update information.

The suspension control system 10 of the vehicle 1 may hold the database of the unsprung displacement map 200 and generate and update its unsprung displacement map 200. That is, the map management device 100 may be included in the suspension control system 10.

4. Preview Control Using Unsprung Displacement Map

ECU 70 of the suspension control system 10 communicates with the map management device 100 via the communication device 50. ECU 70 obtains an unsprung displacement map 200 of the area including the present position of the vehicle 1 from the map management device 100. The unsprung displacement map 200 is stored in the storage device 72. Then, ECU 70 executes preview control, which is a kind of damping control, based on the unsprung displacement map 200. Preview control is performed to reduce vibration of the sprung structure 5.

The first acquisition unit 80, the second acquisition unit 82, the determination unit 84, the calculation unit 86, and the control unit 88 repeatedly execute the following processing for each of the four control target wheels at each time step.

The first acquisition unit 80 acquires the current position of each wheel 2. The relative positional relationship between the reference point of the vehicle position in the vehicle 1 and each wheel 2 is known information. The position of each wheel 2 can be calculated based on the relative positional relationship and the vehicle position indicated by the positional information.

The first acquisition unit 80 calculates the predicted passing position Pf of the wheel 2 after the preview-time tp from the present time. The preview time tp is a predetermined time. The predetermined time is set in advance, for example, so as to be a time required for the actuator 3A of the suspension 3 to output the control force Fc corresponding to the target control force Fc_t after the first acquisition unit 80 specifies the predicted passing position Pf. The preview distance Lp is given by the product of the preview time tp and the vehicle speed V. The predicted passing position Pf is a position ahead of the vehicle-traveling direction by a preview distance Lp from the present position along the predicted moving course in which the wheel 2 is predicted to move. The predicted travel path can be specified, for example, based on the traveling direction of the vehicle 1 and the current position P0 of the wheel 2. The traveling direction can be specified by, for example, the following method. That is, the first acquisition unit 80 maps the current position P0 of the previous time step and the current position P0 of the current time step to the map information. Then, the first acquisition unit 80 specifies the direction from the current position of the previous time step to the current position P0 of the current time step as the traveling direction. As a modification, the first acquisition unit 80 may calculate the predicted traveling route based on the vehicle speed V and the steering angle of the wheel 2, and may calculate the predicted passing position Pf based on the predicted traveling route.

The first acquisition unit 80 obtains the calculated unsprung displacement Zu in the predicted passing position Pf by reading it from the unsprung displacement map 200.

The second acquisition unit 82 acquires the variation of the unsprung displacement Zu per unit-time based on the unsprung displacement Zu acquired by the first acquisition unit 80. The unit time is, for example, the length of one time step. When the main calculation period and the calculation period of the reading of the unsprung displacement map 200 are different, this time step refers to the calculation period of the map reading.

Specifically, the second acquisition unit 82 acquires the difference between the unsprung displacement Zu and the unsprung displacement Zu as the variation of the unsprung displacement Zu per unit-time. The unsprung displacement Zu is read from the unsprung displacement map 200 by the first acquisition unit 80 in the previous time-step. The unsprung displacement Zu is read from the unsprung displacement map 200 by the first acquisition unit 80 at the present time-step. The variation of the unsprung displacement Zu per unit time represents an absolute value.

Next, the determination unit 84 determines whether or not the variation of the unsprung displacement Zu acquired by the second acquisition unit 82 per unit-time is equal to or greater than a threshold value. Thresholds can be determined as appropriate by experimentation or simulation. For example, the time-step of reading from the unsprung displacement map 200 is 10 [ms] and the difference in unsprung displacement Zu is 0.02 [m] If this is the case, the road surface input or unsprung input is 2 [m/s]. Since this is considered to be a large input, which is usually very unlikely to occur, the threshold is determined so that such a value is equal to or greater than the threshold.

In some cases, the variation of the unsprung displacement Zu acquired by the second acquisition unit 82 per unit time is less than the threshold value. Here, the predicted passing position Pf is a variation of the unsprung displacement Zu that does not straddle or straddle the border of the unsprung displacement map 200. Therefore, the calculation unit 86 executes normal preview control. That is, the variation of the unsprung displacement Zu per unit time may be less than the threshold value. The calculation unit 86 calculates the target control force Fc_t of the actuator 3A of the suspension 3 based on the unsprung displacement Zu in the predicted passing position Pf acquired by the first acquisition unit 80. The target control force Fc_t is calculated as follows, for example. The target control force Fc_t corresponds to a required value of the control force Fc required for the preview control.

The equation of motion for the sprung structure 5 of FIG. 3 is represented by the following equation (1).

$$m \cdot Zs'' = C(Zu' - Zs') + K(Zu - Zs) - Fc \qquad (1)$$

In Equation (1), m is the mass of the sprung structure 5, C is the damping factor of the damper 3D, K is the spring constant of the spring 3S, and Fc is the vertical control force generated by the actuator 3A. If the control force Fc completely cancels the oscillation of the sprung structure 5, then $Zs''=0$, $Zs'=0$, $Zs=0$, and the control force Fc is expressed by the following equation (2).

$$Fc = C \cdot Zu' + K \cdot Zu \qquad (2)$$

The control force Fc providing at least the damping effect is expressed by the following equation (3).

$$Fc = \alpha \cdot C \cdot Zu' + \beta \cdot K \cdot Zu \qquad (3)$$

In Equation (3), the control gain $\alpha$ is greater than 0 and less than or equal to 1, and the control gain $\beta$ is also greater than 0 and less than or equal to 1. When the differential term in Equation (3) is omitted, the control force Fc that provides at least the damping effect is expressed by the following Equation (4).

$$Fc = \beta \cdot K \cdot Zu \qquad (4)$$

The calculation unit 86 calculates the target control force Fc_t according to the above-described Equation (3) or Equation (4). That is, the calculation unit 86 calculates the target control force Fc_t by substituting the unsprung displacement Zu in the predicted passing position Pf into Equation (3) or Equation (4).

The control unit 88 transmits a control command including the target control force Fc_t to the actuator 3A so that the actuator 3A generates a control force Fc corresponding to the target control force Fc_t. The actuator 3A generates a control force Fc corresponding to the target control force Fc_t at a timing after the present time by the preview time tp, that is, at a timing at which the wheel 2 passes through the predicted passing position Pf. That is, the control unit 88 controls the actuator 3A so that the control force Fc generated by the actuator 3A when the controlled wheel passes through the predicted passing position Pf matches the target control force Fc_t.

As described above, according to the preview control using the unsprung displacement map 200, when the variation of the unsprung displacement Zu per unit-time is less than the threshold value, the control force Fc can be generated at appropriate timings. The control force Fc is a force for suppressing the oscillation of the sprung structure 5 caused by the unsprung displacement Zu of the predicted passing position Pf of the wheel 2. Thus, vibration of the sprung structure 5 can be effectively suppressed.

On the other hand, when the amount of change in the unsprung displacement Zu per unit time is equal to or greater than the threshold value, it can be determined that the unsprung displacement Zu obtained in the present time step is abnormal, since the predicted passing position Pf straddles the border of the unsprung displacement map 200. Therefore, if it is assumed that the above-described control based on the obtained unsprung displacement Zu is continued, there is a concern that the vibration is increased by the control more than the original input. Therefore, the process of reducing the vibration is executed.

The variation of the unsprung displacement Zu per unit time may be greater than or equal to the threshold value. In this case, the calculation unit 86 calculates the target control force Fc_t so that the amount of change per unit time of the target control force Fc_t is smaller than that in the case where the amount of change is less than the threshold value. The amount of change of the target control force Fc_t per unit time is a difference between the target control force Fc_t calculated in the previous time step and the target control force Fc_t calculated in the current time step. The amount of change of the target control force Fc_t per unit time represents an absolute value.

The variation of the unsprung displacement Zu per unit time may be greater than or equal to the threshold value. Here, for example, the calculation unit 86 applies the rate limiter to the time-series data of the unsprung displacement Zu acquired in the present time step and the past time step. Thus, the calculation unit 86 calculates the target control force Fc_t so that the amount of change of the target control force Fc_t per unit time becomes small. The rate limiter limits the variation of the unsprung displacement Zu per unit-time to a predetermined limit or less. It can also be said that the rate limiter suppresses the variable quantity of the unsprung displacement Zu from the previous time step to the current time step.

That is, the calculation unit 86 corrects the unsprung displacement Zu obtained in the present time step by the rate limiter, thereby making the variation of the unsprung displacement Zu per unit time smaller than that before the correction. Then, the calculation unit 86 calculates the target control force Fc_t by substituting the corrected unsprung displacement Zu into Equation (3) or Equation (4).

When the amount of change of the unsprung displacement Zu per unit time is equal to or greater than the threshold value, the calculation unit 86 limits the amount of change of the target control force Fc_t per unit time by applying the rate limiter for a predetermined control time. That is, when the control time has elapsed, the limit of the amount of change per unit time of the target control force Fc_t ends. The process of limiting the amount of change of the target control force Fc_t per unit time is referred to as a vibration reduction process. The limit value and the control time can be determined as appropriate by experiments or simulations so that the vibration of the sprung structure 5 is reduced.

As a result, when the vehicle 1 passes through the border of the unsprung displacement Zu of the unsprung displacement map 200, a steep change in the target control force Fc_t can be suppressed, so that the generation of vibrations of the sprung structure 5 can be suppressed. For example, when the vehicle 1 travels along the path 304a and the path 304b in FIG. 1A, or the path 304c in FIG. 1B, the vibration of the sprung structure 5 can be reduced with respect to the comparative example in which the vibration reduction process is not performed. Since the rate limiter is applied only between the time of crossing the border between the presence or absence of the unsprung displacement Zu and the time of the subsequent control, the normal damping control is not affected.

In some cases, the unsprung displacement Zu changes more than the threshold. In this case, the calculation unit 86 may apply a low-pass filter to the time-series data of the unsprung displacement Zu acquired in the present time step and the past time step instead of the rate limiter during the control time. By this processing, the calculation unit 86 can limit the amount of change of the target control force Fc_t per unit time. That is, the calculation unit 86 corrects the unsprung displacement Zu obtained in the present time step by the low-pass filter, thereby reducing the variation of the unsprung displacement Zu per unit time compared to the pre-correction value, thereby suppressing a steep change in the unsprung displacement Zu. The cutoff frequency of the low-pass filter can be determined as appropriate by experiments or simulations so that the vibration of the sprung structure 5 is reduced.

In some cases, the unsprung displacement Zu changes more than a threshold value. In this case, instead of the unsprung displacement Zu, the calculation unit 86 may apply a rate limiter or a low-pass filter to the time-series data of the target control force Fc_t calculated in the present time step and the past time step. By this processing, the calculation unit 86 can calculate the target control force Fc_t so that the amount of change of the target control force Fc_t per unit time becomes small.

That is, the calculation unit 86 calculates the target control force Fc_t by substituting the unsprung displacement Zu obtained by the first acquisition unit 80 into Equation (3) or Equation (4) without correcting it. The calculation unit 86 corrects the value of the target control force Fc_t calculated in the current time step by applying a rate limiter or a low-pass filter, thereby making the amount of change of the target control force Fc_t per unit time smaller than that before correction. Then, the calculation unit 86 supplies the corrected target control force Fc_t to the control unit 88.

In addition, the unsprung displacement Zu may change more than a threshold value. In this case, the calculation unit 86 may calculate the target control force Fc_t such that the amount of reduction in the amount of change per unit time of the target control force Fc_t increases as the amount of change increases. In this case, the calculation unit 86 may increase the strength of the rate limiter by decreasing the limit of the rate limiter as the variation of the unsprung displacement Zu per unit time increases. Further, the calculation unit 86 may increase the strength of the low-pass filter by decreasing the cutoff frequency of the low-pass filter or increasing the order or the number of stages of the low-pass filter as the variation of the unsprung displacement Zu per unit time increases. By this process, it is possible to more effectively suppress the generation of vibrations in accordance with the magnitude of the variation of the unsprung displacement Zu per unit time.

Figure 6:
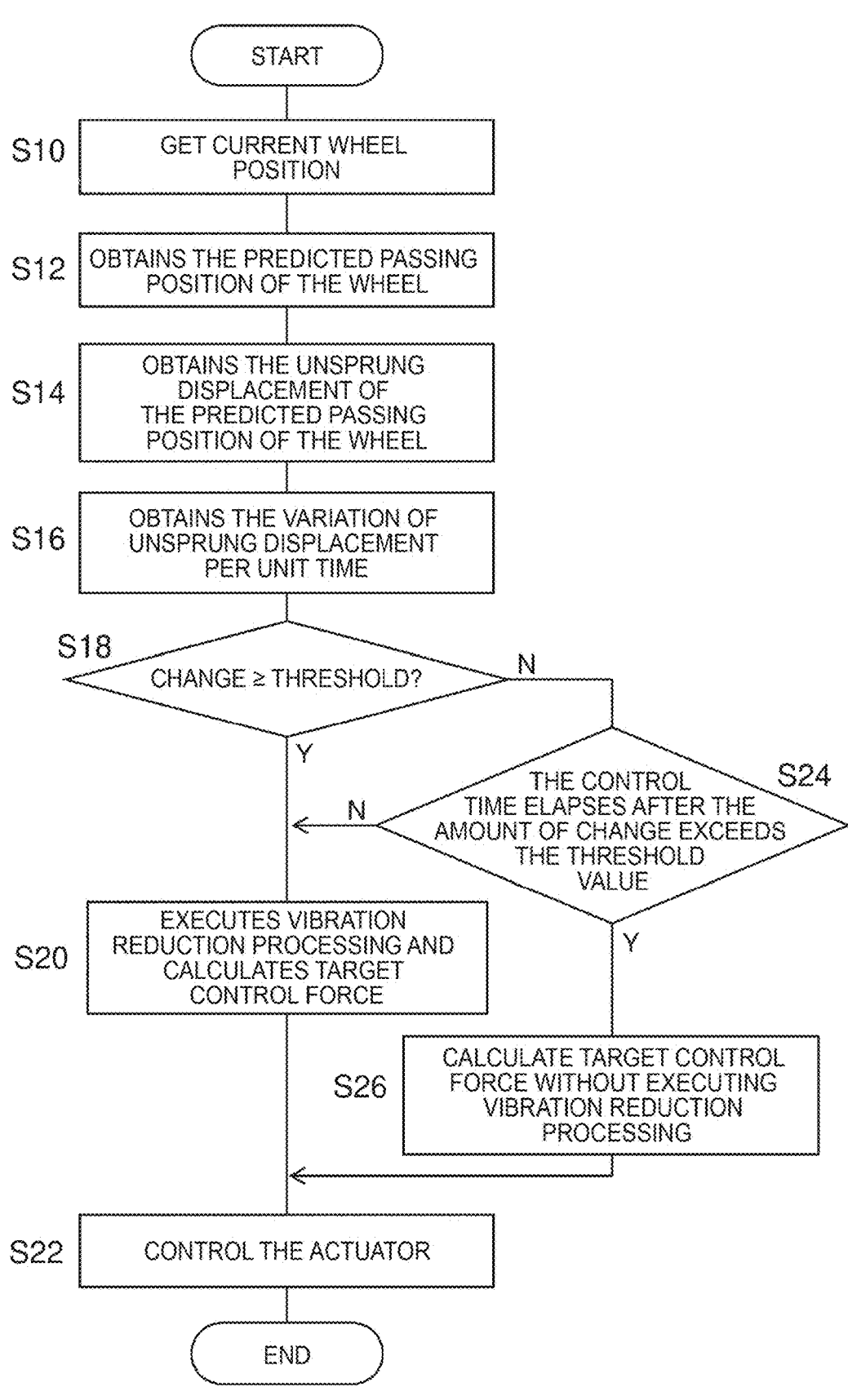
FIG. 6 is a flowchart illustrating a suspension control process according to the embodiment.

FIG. 6 is a flowchart illustrating a suspension control process according to the embodiment. The process of this flowchart is repeatedly executed for each of the controlled wheels at predetermined time steps while the vehicle 1 is traveling.

The first acquisition unit 80 acquires the present position of the wheel 2 (S10), acquires the predicted passing position Pf of the wheel 2 (S12), and acquires the unsprung displacement Zu of the predicted passing position Pf of the wheel 2 from the unsprung displacement map 200 (S14). The second acquisition unit 82 acquires the variation of the unsprung displacement Zu per unit time based on the unsprung displacement Zu acquired in the previous time step and the unsprung displacement Zu acquired in the current time step (S16).

When the variation of the unsprung displacement Zu per unit time is equal to or greater than the threshold value (Y in S18), the calculation unit 86 performs the vibration reduction process to calculate the target control force Fc_t (S20). In addition, the control unit 88 controls the actuator 3A (S22), and ends the process.

On the other hand, there is a case where the variation of the unsprung displacement Zu per unit time is not equal to or larger than the threshold value (N of S18). If the time limit has elapsed since the change reached the threshold value or more (S24 Y), the calculation unit 86 calculates the target control force Fc_t without executing the vibration reduction process (S26), and the process proceeds to S22. Finally, if the time limit has not elapsed since the variation per unit time of the unsprung displacement Zu became equal to or greater than the threshold value (N in S24), the process proceeds to S20.

According to the embodiment, when the amount of change of the road surface displacement-related value per unit time is equal to or larger than the threshold value, the target control force Fc_t is calculated so that the amount of change of the target control force Fc_t per unit time becomes small. Accordingly, it is possible to suppress the occurrence of vibration at the boundary of the road surface displacement-related value without affecting the control at the boundary other than the boundary of the presence or absence of the road surface displacement-related value. Therefore, it is possible to suppress a sense of discomfort in riding comfort caused by execution of the preview control.

The present disclosure has been described above based on the embodiment. It should be understood by those skilled in the art that the embodiment is merely an example, and that various modifications are possible in combination of each component and each process, and that such modifications are within the scope of the present disclosure.

First Modification

The control unit 88 may control the actuator 3A to execute the following feedback control as the damping control in addition to the preview control described above. That is, the feedback control is performed in order to reduce vibration of the sprung structure 5. The control force Fc in the case where the preview control is performed with the feedback control is expressed by the following equation (5), for example. In this example, the calculation unit 86 calculates the target control force Fc_t according to Equation (5).

$$Fc = \beta \cdot K \cdot Zu + \gamma \cdot Zs \qquad (5)$$

The first term on the right side of Equation (5) is the same as Equation (4), and is a feedforward term related to preview control. The second term on the right side is a feedback term related to feedback control. This feedback term is the product of the feedback gain γ and the sprung displacement Zs at the time of calculation of the target control force Fc_t. Instead of the sprung displacement Zs of the feedback term, any one of the sprung speed Zs', the sprung acceleration Zs", the unsprung displacement Zu, the unsprung speed Zu', and the unsprung acceleration Zu" at the time of calculation of the target control force Fc_t may be used.

When the variation of the sprung displacement Zs per unit-time is less than the threshold value, the calculation unit 86 sets the basic gain γ0 as the feedback gain γ of the feedback control.

When the amount of change of the sprung displacement Zs per unit time is equal to or greater than the threshold value, the calculation unit 86 increases the feedback gain γ during the control time as compared with the case where the amount of change is less than the threshold value. That is, in this case, the calculation unit 86 sets the gain γ1 larger than the basic gain γ0 as the feedback gain γ. In this case, the target control force Fc_t calculated according to the above equation (5) is larger than when the feedback gain γ is the basic gain γ0. That is, when the amount of change of the sprung displacement Zs per unit time is equal to or greater than the threshold value, the feedback control is actively utilized as compared with the case where the amount of change is less than the threshold value.

The basic gain γ0 and the gain γ1 can be appropriately determined by experiment or simulation. The gain γ1 may be a fixed value. Further, the larger the variation of the unsprung displacement Zu per unit time, the stronger the strength of the rate limiter or the stronger the low-pass filter may be. In this case, the gain γ1 may be set to be larger as the variation of the unsprung displacement Zu per unit-time is larger.

Thus, during the execution of the vibration reduction process in which the vibration damping effect by the preview control is temporarily weakened, the vibration deterioration of the sprung structure 5 can be suppressed by more positively performing the vibration damping using the feedback control.

Second Modification

The variation of the sprung displacement Zs per unit time may be greater than or equal to a threshold value. During the control period, the control unit 88 may perform preview control using the unsprung displacement Zu1 calculated for the passing position of the front wheel in addition to the preview control using the unsprung displacement map 200 described above. Since the rear wheels are considered to follow the path of the front wheels, such control may be performed. The control force Fc is expressed by the following equation (6), for example. In this example, the calculation unit 86 calculates the target control force Fc_t according to Equation (6) during the execution of the vibration reduction process.

$$Fc = \beta \cdot K \cdot Zu + \gamma a \cdot Zu1 \qquad (6)$$

The first term on the right side of Equation (6) is the same as Equation (4), and is a feedforward term related to preview control using the unsprung displacement map 200. The second term on the right side is a feedforward term for preview control using the unsprung displacement Zu1 calculated for the passing position of the front wheel. The second term on the right side is the product of the gain γa and the unsprung displacement Zu1 of the passing position of the front wheel at the time of calculation of the target control force Fc_t. As described above, the unsprung displacement Zu1 can be calculated using the detected value of the sprung acceleration sensor 22. The gain γa can be appropriately determined by experiment or simulation.

During the vibration reduction process in which the damping effect by the preview control using the unsprung displacement map 200 is temporarily weakened, the rear wheels are damped by the preview control using the unsprung displacement Zu1 calculated for the passing position of the front wheels. Thus, deterioration of vibration of the sprung structure 5 can be suppressed.

Third Modification

When the variation of the sprung displacement Zs per unit time is equal to or greater than the threshold value, the control unit 88 may execute the preview control using the known preview sensor in addition to the preview control using the unsprung displacement map 200 during the control time. The preview sensor (not shown) includes, for example, at least one of a camera sensor, a LiDAR, a radar sensor, and the like. The preview sensor acquires the road surface displacement of the road surface in front of the vehicle 1. The control force Fc is expressed by the following equation (7), for example. In this example, the calculation unit 86 calculates the target control force Fc_t in accordance with Equation (7) during the execution of the vibration reduction process.

$$Fc = \beta \cdot K \cdot Zu + \gamma b \cdot Z0 \tag{7}$$

The first term on the right side of Equation (7) is the same as Equation (4), and is a feedforward term related to preview control using the unsprung displacement map 200. The second term on the right side is a feedforward term related to preview control using a preview sensor. The second term on the right side is the product of the gain γb and the road surface displacement Z0 ahead of the vehicle 1 acquired by the preview sensor at the time of calculation of the target control force Fc_t. The gain γb can be appropriately determined by experiment or simulation. Since preview control using a preview sensor is known, further detailed description thereof will be omitted.

During the execution of the vibration reduction process in which the vibration damping effect by the preview control using the unsprung displacement map 200 is temporarily weakened, the vibration is damped by the preview control using the preview sensor. Thus, deterioration of vibration of the sprung structure 5 can be suppressed.

At least two of the first modification, the second modification, and the third modification may be combined.

Further, in the embodiment, the preview control is performed for four wheels 2 of the vehicle 1, that is, all wheels. However, the control target wheels, which are the wheels to be subjected to the preview control, are not limited to all the wheels, and may be, for example, only the left and right front wheels or only the left and right rear wheels.

What is claimed is:

1. A suspension control system comprising:
   an actuator that adjusts a suspension stroke of a control target wheel of a vehicle; and
   a processor that controls the actuator, wherein:
   the processor is configured to
      repeatedly acquire, from a road surface data map in which a road surface displacement-associated value associated with vertical displacement of a road surface is associated with a position, the road surface displacement-associated value at a predicted passing position of the control target wheel a predetermined period after a present time,
      acquire a change amount of the road surface displacement-associated value per unit time based on the acquired road surface displacement-associated value,
      calculate a target control force based on the acquired road surface displacement-associated value,
      control the actuator such that a control force generated by the actuator coincides with the target control force when the control target wheel passes the predicted passing position, and
      execute feedback control for reducing vibration of a sprung structure by controlling the actuator; and
   when the acquired change amount of the road surface displacement-associated value per unit time is equal to or larger than a threshold value, the processor is configured to calculate the target control force to reduce a change amount of the target control force per unit time and increase a feedback gain of the feedback control, compared with a case where the acquired change amount is smaller than the threshold value.

2. The suspension control system according to claim 1, wherein when the acquired change amount of the road surface displacement-associated value per unit time is equal to or larger than the threshold value, the processor is configured to calculate the target control force to reduce the change amount of the target control force per unit time by applying a rate limiter or a low-pass filter to time-series data of the acquired road surface displacement-associated value or time-series data of the target control force.

3. The suspension control system according to claim 2, wherein the processor is configured to apply the rate limiter or the low-pass filter for a predetermined control period when the acquired change amount of the road surface displacement-associated value per unit time is equal to or larger than the threshold value.

4. The suspension control system according to claim 1, wherein when the acquired change amount of the road surface displacement-associated value per unit time is equal to or larger than the threshold value, the processor is configured to calculate the target control force to increase an amount of reduction in the change amount of the target control force per unit time as the acquired change amount increases.

* * * * *